United States Patent [19]

Ban

[11] Patent Number: 5,404,485
[45] Date of Patent: Apr. 4, 1995

[54] FLASH FILE SYSTEM

[75] Inventor: Amir Ban, Tel Aviv, Israel

[73] Assignee: M-Systems Flash Disk Pioneers Ltd., Tel Aviv, Israel

[21] Appl. No.: 27,131

[22] Filed: Mar. 8, 1993

[51] Int. Cl.⁶ .............................................. G06F 12/02
[52] U.S. Cl. .............................. 395/425; 364/DIG. 1; 364/246.3; 364/256.3
[58] Field of Search ............................... 395/400, 425; 364/200 MS File, 900 MS File

[56] References Cited

U.S. PATENT DOCUMENTS

| | | | |
|---|---|---|---|
| 4,511,964 | 4/1985 | Georg et al. | 395/400 |
| 5,193,184 | 3/1993 | Belsan et al. | 395/600 |
| 5,210,866 | 5/1993 | Milligan et al. | 395/575 |
| 5,301,288 | 4/1994 | Newman et al. | 395/400 |

Primary Examiner—Joseph L. Dixon
Assistant Examiner—Hiep T. Nguyen
Attorney, Agent, or Firm—Mark M. Friedman

[57] ABSTRACT

The provision of a flash memory, virtual mapping system that allows data to be continuously written to unwritten physical address locations. The virtual memory map relates flash memory physical location addresses in order to track the location of data in the memory.

6 Claims, 5 Drawing Sheets

FLASH FILE SYSTEM

BACKGROUND OF THE INVENTION

1. Field of the Invention

This invention relates to an improved system for storing and retrieving information in flash memories, and more particularly to a system that organizes and manages data written to a flash memory.

2. Description of the Prior Art

As will be appreciated by those skilled in the art, electrically erasable and programmable read-only memories (EEPROMs) comprised of flash-type, floating-gate transistors have been described in the art and are presently commercially available. These so-called flash memories are non-volatile memories similar in functionality and performance to EPROM memories, with an additional functionality that allows an in-circuit, programmable, operation to erase blocks of the memory. In a flash memory, it is not practical to rewrite a previously written area of the memory without a preceding block erase of the area. While this invention will be described in the context of a flash memory, those skilled in the art will understand that its teachings are also applicable to data storage devices with the same write, read, and block erase before write characteristics as flash memories.

In a typical computer system, the operating system program is responsible for data management of the data storage devices that are a part of the system. A necessary, and usually sufficient, attribute of a data storage device to achieve compatibility with the operating system program is that it can read data from, and write data to, any location in the data storage medium. Thus, flash memories are not compatible with typical existing operating system programs, since data cannot be written to an area of flash memory in which data has previously been written, unless the area is first erased.

Software products have been proposed in the prior art to allow a flash memory to be managed by existing computer operating programs without modification of the operating system program. However, these prior art programs operate the flash memory as a "write once read many" device. This prior art software product cannot recycle previously written memory locations. When all locations are eventually written the memory cannot be further used without specific user intervention.

SUMMARY OF THE INVENTION

An object of this invention is the provision of a method (i.e., software, firmware or hardware) to control and manage access to a flash memory so that the flash memory appears to the computer operating system as a data storage device in which it is possible to read data from, and write data to, any flash memory location. A method that allows flash memory to emulate random access memories and allows existing computer operating systems to provide all other required support in the same manner provided by standard random access memories and independent of the emulation method.

Briefly, this invention contemplates the provision of a flash memory, virtual mapping system that allows data to be continuously written to unwritten physical address locations. The virtual memory map relates flash memory physical location addresses in order to track the location of data in the memory.

The flash memory physical locations are organized as an array of bytes. Each of the bytes in the array is assigned a number or address by means of which the byte is physically accessible, referred to herein as the physical address space. Each of the bytes in the array has a second address, called the virtual address space. A table, called a virtual map, converts virtual addresses to physical addresses. Here it should be noted, the virtual address space is not necessarily the same size as the physical address space.

A contiguous, fixed-length group of physical byte addresses form a block. For example, assuming a block size of 512 bytes, a byte with a physical address of 256211 is byte number 211 in block 500 ($256211 \div 512 = 500 + 211$). One or more physically contiguous flash memory areas (called zones) make up a unit which can be physically erased using suitable prior art flash memory technology. Each unit contains an integral number of blocks.

The virtual memory map is a table in which the first entry belongs to virtual block 0, the second to virtual block 1, and so on. Associated in the table with each virtual block address there is a corresponding physical address. In a read from the flash memory operation, a computer generated address is decoded as a virtual block address and a byte location within the block. The virtual memory map is used to convert the virtual block address to a physical block address; the byte location is the same in the virtual address space and the physical address space.

In a write operation, the computer generated address is again interpreted as a virtual block address and a byte location within the block. The virtual memory map converts this to a physical memory block address. If the flash memory block corresponding to the physical address is then currently written, it is generally not possible to write to this physical address. An unwritten block is therefore located and written to. The virtual memory map is changed so that the unwritten physical block address is mapped to the original virtual address and original physical address is denoted as unusable and remains unusable until there is a zone erase operation that erases the unit that includes that block. It will be noted that a write operation assumes that an entire block will be rewritten. This is the manner in which computer systems usually access data in a storage media. However, it will be appreciated that in general, any desired number of bytes could be written to the new storage location.

In a preferred embodiment of the invention, each unit is assigned a logical unit address that remains unchanged as the unit is rewritten into a new physical address location in flash memory. The virtual map contains references to the logical unit addresses rather than the physical unit addresses so that data movement during unit transfers has no effect on the virtual map.

Each unit has a usage map of all the blocks within the unit; the virtual address of a block, if it is mapped, and special characters to denote free blocks and to denote unusable blocks.

Unusable blocks of previously written flash memory are reclaimed by transferring memory units that include the unusable blocks to a reserved unwritten space in the flash memory. Only the usable blocks are written in the transfer operation so that, as rewritten, the locations where the unusable blocks were, are not rewritten in the reserved space and are thus usable. After having been rewritten, the original memory unit space is flash erased as a unit and thus becomes an unwritten reserved space to which a subsequent transfer can be made.

Also, in a preferred embodiment of the invention, the virtual map is stored primarily in the flash memory with only a small secondary virtual map in random access memory. The virtual map in flash memory is stored in blocks and organized into pages whose size is equal to the product of the number of bytes in a block times the number of physical block addresses this number of bytes represents. A secondary random access memory contains the page addresses. In reading data for a given virtual address, the page number is determined by dividing address by the page size. The result indexes the secondary virtual map to find the correct primary virtual map block. The remainder is used to calculate the required physical address for the virtual map stored in flash memory. To alter the virtual map in flash memory, the altered map is written into a free block and the secondary map in random access memory is altered to reflect the change in the primary virtual map location. The replaced block is marked as deleted.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
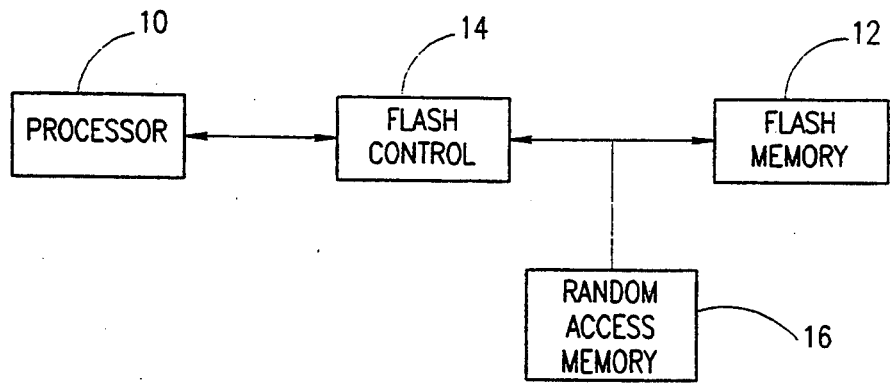
FIG. 1 is a block diagram illustrating functional components of a system in accordance with one embodiment of a system in accordance with the teachings of this invention.

Referring now to FIG. 1 of the drawings, in a typical system a processor 10, in combination with its operating system software, issues a series of read and write commands to read from, and write data to, specific address locations in a random access memory. As will be appreciated by those skilled in the art, in a random access storage device, such as a disk memory, data can be written to, or read from, any address location. In the system of FIG. 1, the processor 10 writes data to, and reads data from, a flash memory 12 in blocks at specific address locations. Although zones of the flash memory 12 can be erased, currently written address locations cannot be rewritten until the entire zone is erased. In accordance with the teachings of this invention, a flash memory controller 14 provides a fully rewritable virtual address space so that the flash memory 12 emulates a random access memory, such as a disk memory, and the processor operating system software provides all other required operating support (such as a file system) in the same manner as it provides for a standard random access memory, and in a manner that is independent of the flash memory 12 and its controller 14. A typical system also includes a conventional random access memory 16. It will be appreciated that controller 14 functions may be carried out in software, firmware or hardware, and would not necessarily exist as a physically separate unit as the drawing suggests.

Figure 2:
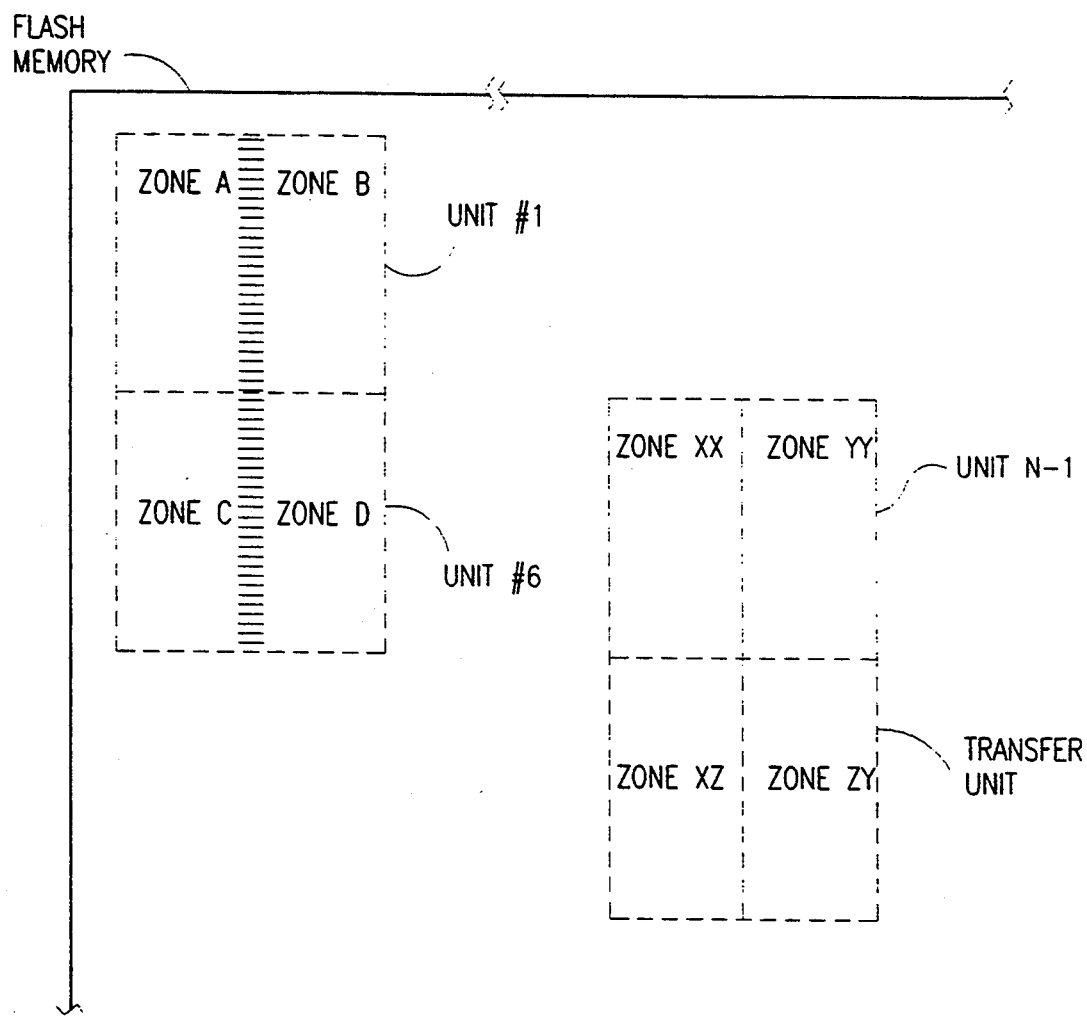
FIG. 2 is a pictorial illustration of one level of flash memory organization in accordance with the teachings of this invention.

Referring now to FIG. 2, it illustrates in part the organization of the flash memory. The flash memory has a number of zones labeled here as zone A, zone B, etc. Each zone is comprised of a number of contiguous physical memory locations that can be block erased using conventional, well known, flash memory technology. The zones are organized as units only four of which are shown, labeled in the drawing as; UNIT #1, UNIT #6, UNIT N-1 and TRANSFER UNIT. Each unit is comprised of at least one zone, or a plurality of contiguous zones. Here illustrated, each unit is comprised of two zones (i.e., UNIT #1—zone A and zone B; UNIT #2—zone C and zone D, TRANSFER UNIT—zone X2 and 24).

Each unit is comprised of an integral number of addressable blocks and each block, in turn, is comprised of a contiguous, fixed length group of bytes. At all times, there will be a unit in the memory 12 that is unwritten (i.e., TRANSFER UNIT), so that active blocks in a unit that is to be erased can be written to this unwritten unit prior to erasing the unit.

Figure 3:
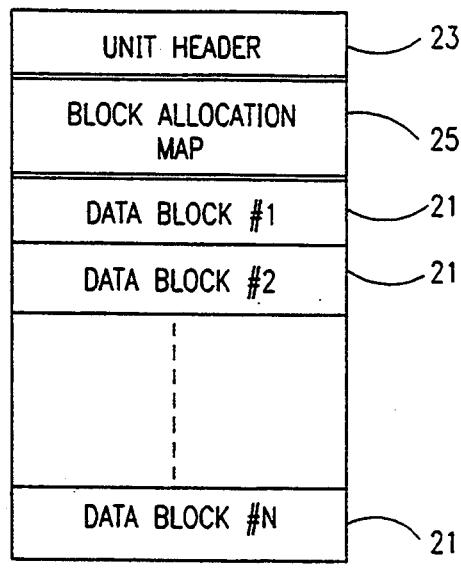
FIG. 3 is a pictorial illustration of how a unit is formatted.

Referring now to FIG. 3, each unit contains an integral number of contiguous data blocks 21 that are in turn comprised of contiguous byte addresses, that can be addressed as a block number and offset within the block. Each block in a unit can be addressed by block number and offset with the unit. Each unit has a unit header 23 and a map 25 of the allocation status of each block in the unit. The unit header 23 includes a format identifier, and the logical unit number of the unit. Because data must move physically during a unit transfer, the unit number preferably remains unchanged even as the physical location of the unit in the flash memory 12 changes. In addition, the header may also include system-wide information. The block allocation map 25 has a word for each block that denotes its status and its offset in the unit. The status indications are: "block free and writable"; "block deleted and not writable"; "block allocated and contains user data"; and virtual address of the block (back pointer).

Figure 4:
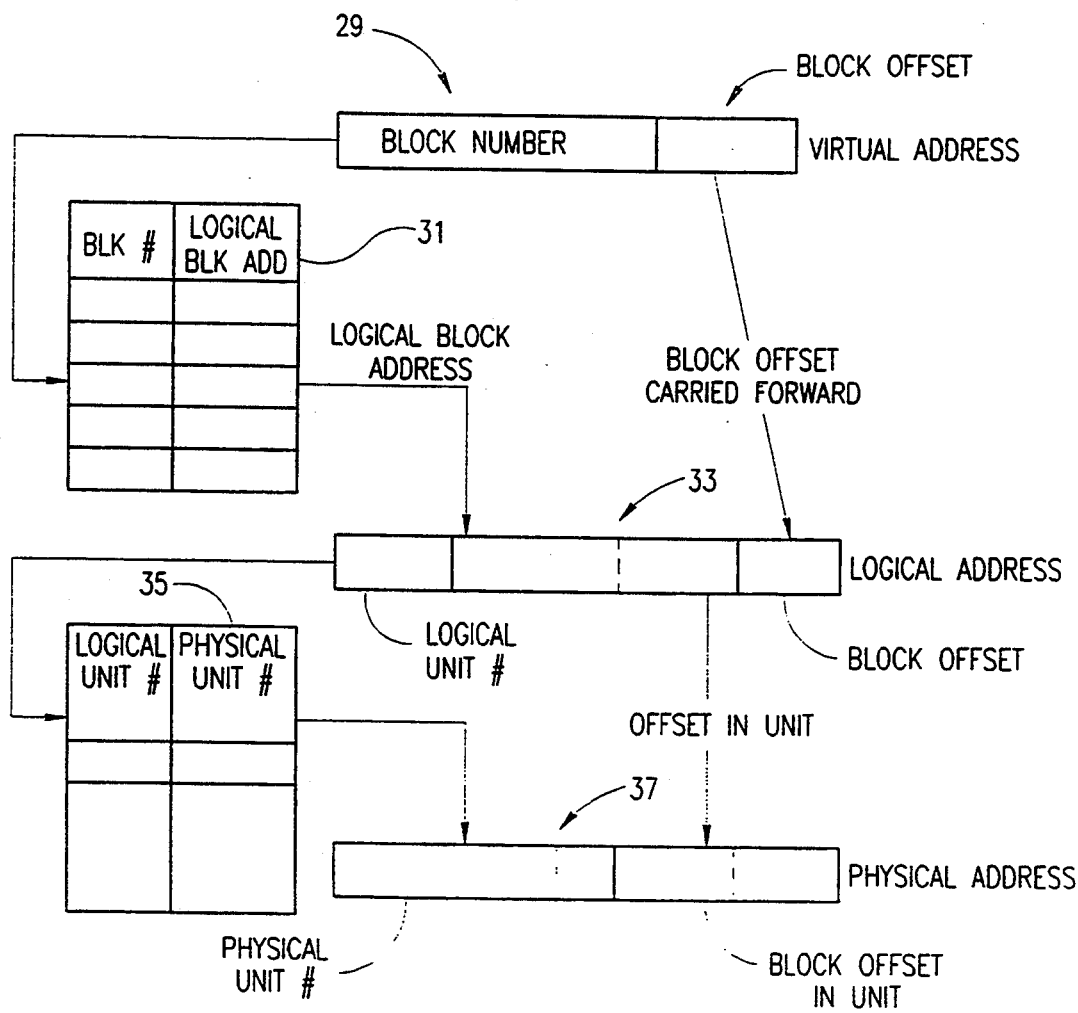
FIG. 4 is a pictorial representation illustrating how the computer generated addresses are mapped to physical addresses.

As previously mentioned, preferably each unit is assigned a logical unit number that does not change, even though the physical location in the memory of the unit changes. As illustrated in FIG. 4, the computer generated addresses 29 are comprised of a block number and a block offset. These addresses are interpreted by the flash controller 14 as virtual addresses, and a virtual map is used to establish a correspondence between the virtual address space and physical address space. The virtual map changes as blocks are rewritten and the virtual address space is therefore dynamic. It should be noted also that, at any given time, a block or blocks in the virtual address space may be unmapped to the physical address space, and that blocks in the physical address space may be unwritten and, therefore, free to be written into.

Since the data moves physically during a unit transfer to an unwritten unit space, the units are assigned logical unit numbers that do not change with changes in the physical location of the unit in the memory. A virtual map 31 maps block numbers to logical unit address in the first step of a two level address translation. The logical unit address is an address relative to a logical unit number, similar to a physical address, which is an address relative to a physical unit number. The logical unit number is the high order binary digits of the logical address and may be derived from the logical address by a bit shift operation. The logical address 33 obtained from map 31 includes a logical unit number along with the offset of the block within the unit.

A logical unit table 35 translates the logical unit number to a physical unit number for the logical unit. This two-step address translation procedure obviates the need to change block addresses in the map when a unit is moved to a new physical location.

Figure 5:
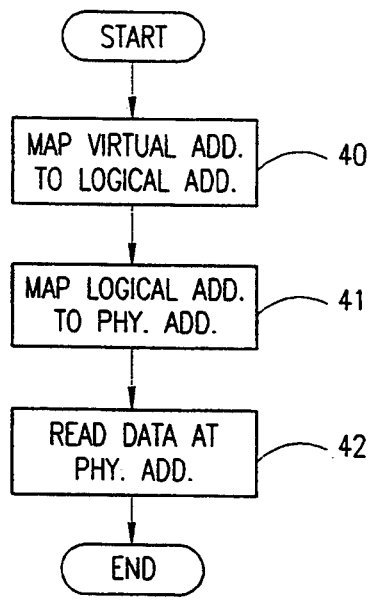
FIG. 5 is a flow diagram illustrating a read operation.

In a read operation the virtual address 29 comprised of a block address, for example, initially is mapped to a logical unit number and a block offset within the unit in the addressed block. Map 35 maps the unit number 33 to a physical address 37 for the unit along with the offset of the addressed 37 block within the unit, and the addressed data block is read from this physical location. Here it is assumed that data is read and written on a block basis as is typically done. Of course, data could be written and read on a byte basis using the same principle, if desired. FIG. 5 is a flow diagram illustrating this read operation. As previously explained, the virtual address 29 is mapped to a logical address (block 40) in the first step of a two-step address translation. In the second step, the logical address is mapped to a physical address in the flash memory, block 41. Data at this physical address is read, block 42, which terminates this operation.

Figure 6:
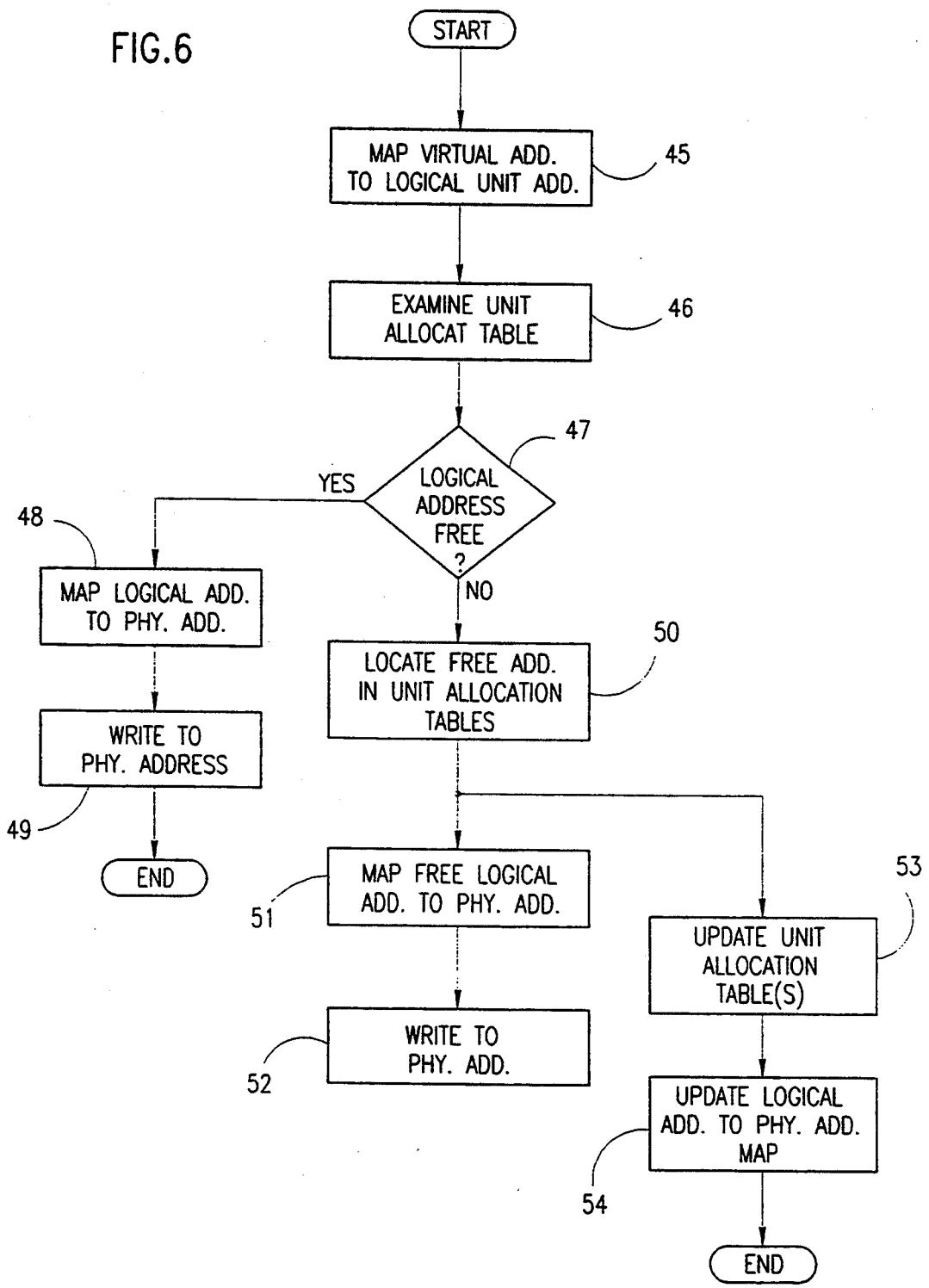
FIG. 6 is a flow diagram illustrating a write operation.

In a write operation, the virtual address 29 is again mapped initially to a logical unit number and a block offset within the unit. The controller 14 algorithm examines the block allocation map 25 for this unit. If the block corresponding to this address has been written, a write command cannot be executed at the corresponding physical address. The control algorithm scans the block allocation maps 25 for each unit until a free block is located. The status of the block in the block map 25 at the original unit address is changed to deleted in the block in the allocation map, and the status of the free block is changed to written. The virtual map 31 is updated so that the original virtual address now points to the new logical address where the write operation is to take place. This logical address is mapped to a physical address, in the manner previously described, and the block is written to this address. FIG. 6 is a flow diagram illustrating this write operation. In a write operation the virtual address 29 is mapped to a logical unit address, block 45, and the unit allocation for the unit is examined, block 46. If in decision block 47 the unit address is free, the unit address is mapped to a physical address, block 48, and data is written to this physical address, block 49, and the operation ends. If the logical address is not free (block 47), the unit tables are scanned to locate a free address in the unit allocation tables, block 50. This new logical address is mapped to a physical address, block 51, and the data is written to this physical address, block 52. The unit allocation tables are updated (block 53) to indicate that the original block is deleted and not writable, and that the new block is allocated and contains user data. The virtual to logical address map is then updated to point to the new physical address of the data corresponding to the original virtual address, blocks 54 and 55.

To enable reading and writing operations to continue without limitation, physical memory space is reclaimed periodically. As explained previously, at least one unit of the memory is reserved at all times so that it consists entirely of free blocks and serves as a TRANSFER UNIT.

Figure 7:
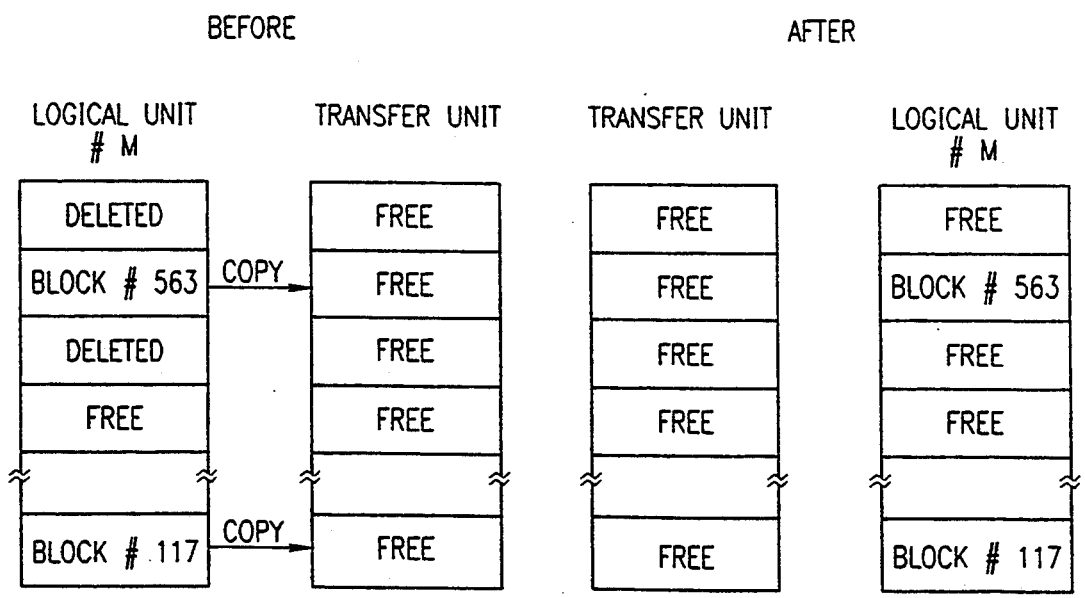
FIG. 7 is a pictorial diagram illustrating the status of a unit before and after a transfer operation.
Figure 8:
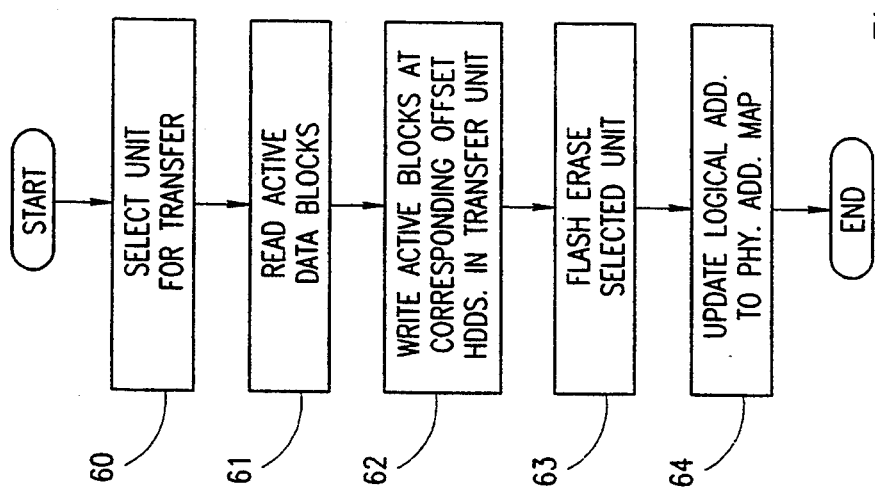
FIG. 8 is a flow diagram of a transfer operation.

Referring now to FIG. 7, an active unit is selected (here, UNIT #M) and all of its currently-mapped active blocks are read and then written to the TRANSFER UNIT. The selected unit #M is then block erased, and it becomes the TRANSFER UNIT while the transfer unit to which the active blocks have been written becomes, in this example, unit #M. FIG. 7 illustrates the status of the units before and after a transfer operation. FIG. 8 is a flow diagram of this transfer operation. In a transfer operation a unit is selected for transfer, block 60, and the active data blocks in the selected unit are read, block 61. These active data blocks are then written to the transfer unit at positions in the transfer unit corresponding to the positions at which they were located in the original unit, block 62. The original unit selected is then flash erased, block 63, and the logical to physical address map is changed so that the selected unit becomes the transfer unit and the transfer unit is assigned the unit number of the selected unit, block 64.

The system thus far described requires a virtual map whose contents are freely updated, and such a map may be stored in a conventional random access memory. However, assuming, for example, a block size of 512 bytes, since the virtual map contains a entry for each block, and each entry may be, for example, 4 bytes long (i.e., capable of addressing up to 4 Gigabytes of memory), a flash memory of 80 Mbytes would require a memory of 640 Kbytes to store the map tables. In order to limit the amount of random access memory required to store the virtual map, in a preferred embodiment of the invention, a major portion of the map data is stored in the flash memory 12 itself, and a secondary virtual map that maps virtual addresses from the computer to the primary virtual map is stored in a random access memory, such as memory 16. An important point to be made here is that the secondary virtual map arrangement makes the procedure for reading and writing the virtual map identical to the procedures for reading and writing ordinary data explained earlier. The virtual map itself treated in a manner equivalent to the user data in the foregoing description and the virtual map stored in random access memory (i.e., secondary virtual map) is the equivalent of the virtual map in the previous description.

In this embodiment, the virtual map resides in the flash memory 12 at negative virtual addresses; ordinary space starts at virtual address zero. The virtual map maps the negative address used by itself, so that the virtual map residing in flash memory can be read and written like ordinary user data, and only the portion of the virtual map that maps itself (i.e., the secondary virtual map) resides in random access memory.

In a simplified example, assume a virtual map of 6000 bytes stored in twelve virtual map blocks, each of 512 bytes. Assuming a four-byte address, each block can store 128 physical addresses. Thus, each block contains the addresses of 64 Kbytes of virtual flash memory. Each block of virtual flash memory addresses is considered as a page and the random access memory stores the page addresses; (in this example, only 48 bytes) mapped to the address blocks. In reading data from a given virtual address, the address is divided by the page size (64 Kbytes) to obtain a page number in the secondary virtual memory that maps to the page block of the primary virtual map where the address is stored. With the virtual memory page block, the procedure to map to a specific flash memory physical address can proceed in the manner already described. For example, after the virtual address is divided by the page size, the remainder can be divided by the virtual memory block size (e.g., 512) to obtain an index to the array of address read from flash memory.

In writing data to a given virtual address, the computer generated address is also divided by the page size to obtain an index to the secondary virtual map in flash memory. The secondary virtual map maps to the primary virtual map, where the primary virtual map block is read; and this is used to map to the physical block that has been addressed where it is read. As this block cannot be rewritten, an unwritten block is identified and written into in the manner previously described, with the original data block marked as deleted. To update the virtual map residing flash memory, essentially the same procedure is followed. The virtual map block, in its modified form to reflect the new physical location of the addressed data, is written to an unwritten block in the flash memory and the old block is marked as deleted. The secondary virtual memory in random access memory is changed, as needed, to reflect the change in the primary virtual memory block locations.

Figure 9:
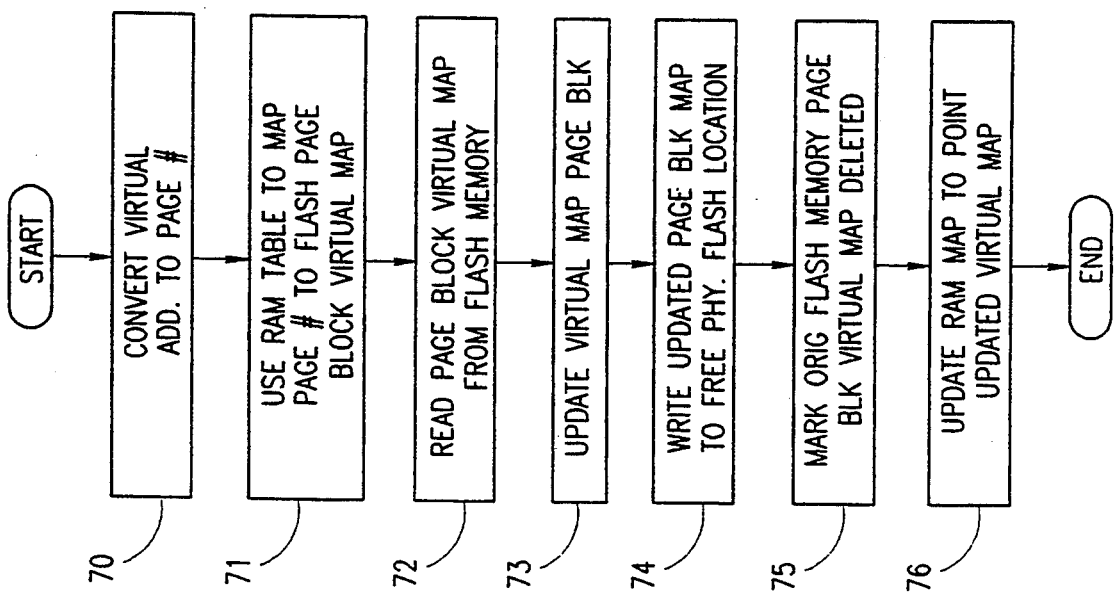
FIG. 9 is a flow diagram illustrating the operation where a major portion of the virtual to physical map is stored in flash memory.

FIG. 9 is a flow diagram of this operation. The first step in this process is to convert a virtual address to a page number, block 70 and to use the page number to locate in RAM 16 the address, in flash memory 12, of the relevant page block of the virtual map stored in the flash memory, block 21. The page block of the virtual map at this address is read from the flash memory (block 72) and used in the manner previously described to a locate physical address corresponding to the virtual address for a data read or data write operation. In a data write operation, the virtual map page block must be updated, block 73, and the updated page block virtual map is written to a free flash memory physical address location, block 74. The original flash memory address at which the page block virtual map was located is marked as deleted, block 75, and the RAM memory 16 is updated to point to the virtual to physical map address for the updated map, block 76.

The virtual map can be readily reconstructed upon system startup. The virtual maps residing in flash memory are non-volatile and do not require reconstruction. The secondary virtual map residing in volatile random access memory can be reconstructed by scanning, at startup, the block usage map that resides at the top of each unit. Blocks marked as mapped to a virtual address are identified, and the secondary virtual map is constructed accordingly.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A memory management method for a memory in which data can be written only in unwritten physical memory locations and in which a zone of contiguous memory locations can be simultaneously erased, comprising the steps of:
   organizing the memory into a plurality of units;
   organizing each unit into a plurality of blocks, each of said blocks made up of a plurality of contiguous physical memory locations;
   establishing an allocation map for each unit which indicates the status of each block in a unit as written, unwritten or deleted;
   establishing a virtual map to map virtual addresses to physical addresses;
   in writing data to said memory at a virtual address:
   (a) mapping said virtual address to a physical block address using said virtual map;
   (b) examining said allocation map for said unit to which said virtual address has been mapped in step (a) to determine the status of a block at said physical block address as written, unwritten or deleted;
   (c) if said block at said physical block address is in written or deleted status:
      (1) examining said allocation map for at least one of said units to identify an unwritten block address;
      (2) writing said data into said memory to said unwritten block address;
      (3) changing said allocation map for a block in a unit in which said data have been written in paragraph (c)(2) to indicate as written said previously unwritten block address where said data have been written;
      (4) changing said virtual map to map virtual addresses to physical addresses within a unit so that said virtual map maps said virtual address to the physical address of said previously unwritten block in which said data have been written in step (c)(2);
   establishing a transfer unit in said memory in which all blocks are in unwritten status, said transfer unit including a transfer unit allocation map;
   periodically identifying a selected unit, other than said transfer unit, to be erased;
   reading each written block in said selected unit;
   writing each written block in said selected unit into said transfer unit;
   updating said transfer unit allocation map to indicate as written the status of blocks that have been written in the just previous writing step;
   erasing said selected unit;
   updating said virtual map to reflect the above-described movement of said written blocks.

2. A memory management method for a memory in which data can be written only in unwritten physical memory locations and in which a zone of contiguous memory locations can be simultaneously erased, comprising the steps of:
   storing in said memory a first virtual map which maps virtual addresses to physical addresses;
   organizing said first virtual map stored in said memory in segments of page addressable blocks;
   storing in a random access memory a second virtual map which maps page addresses to physical addresses of said page addressable blocks in said memory;
   changing a page addressable block in said first virtual map stored in said memory by writing a changed page addressable block in an unwritten physical block location; and
   updating said second virtual map stored in said random access memory so that it maps the page address of the changed page addressable block to the unwritten physical block location in which said changed page addressable block has been written.

3. A memory management method for a memory in which data can be written only in unwritten physical memory locations and in which a zone of contiguous memory locations can be simultaneously erased, comprising the steps of:

organizing the memory into a plurality of units;

organizing each unit into a plurality of blocks, each of said blocks made up of a plurality of contiguous physical memory locations;

establishing a first virtual map to map virtual addresses to physical addresses within a unit;

storing in said memory said first virtual map organized in segments of page addressable blocks;

storing in a random access memory a second virtual map which maps pages to physical address of said page addressable blocks stored in said memory; and in writing data to said memory at a virtual address:
(a) deriving a page address from said virtual address;
(b) mapping said page address to a page addressable block in said memory;
(c) reading a segment of said first virtual map which maps virtual address to physical address at said page addressable block in said memory;
(d) mapping said virtual address to a physical address;
(e) if said block at said physical address is in written or deleted status;
 (1) writing said data into said memory to an unwritten block address;
 (2) changing said first virtual map segment so that said first virtual map maps said virtual address to the physical address of the unwritten block in which said data have been written in step (e)(1);
 (3) writing the changed first virtual map segment from step (e)(2) in an unwritten physical block location in said memory;
 (4) updating said second virtual map stored in said random access memory so that it maps the page address of the changed first virtual map segment of said unwritten physical block location.

4. A memory management method for a memory in which data can be written only in unwritten physical memory locations and in which a zone of contiguous memory locations can be simultaneously erased, comprising the steps of:

organizing the memory into a plurality of units;

organizing each unit into a plurality of blocks, each of said blocks made up of a plurality of contiguous physical memory locations;

establishing an allocation map for each unit which indicates the status of each block in a unit as written, unwritten or deleted;

establishing a virtual map to map virtual addresses to physical addresses within a unit;

in writing data to said memory at a virtual address:
(a) mapping said virtual address to a physical block address using said virtual map;
(b) examining said allocation map for said unit to which said virtual address has been mapped in step (a) to determine the status of a block at said physical block address as written, unwritten or deleted;
(c) if said block at said physical block address is in written or deleted status:
 (1) examining said allocation map for at least one of said units to identify an unwritten block address;
 (2) writing said data to said unwritten block address;
 (3) changing said allocation map for a block in a unit in which said data have been written in step (c)(2) to indicate as written said previously unwritten block address where said data have been written;
 (4) changing said virtual map to map virtual addresses to physical addresses within a unit so that said virtual map maps said virtual address to the physical address of said previously unwritten block in which said data have been written in step (c)(2); and in reading data from said memory at a virtual address:
(d) mapping said virtual address to a physical block address using said virtual map;
(e) reading said data from said memory at said physical address;

establishing a transfer unit in said memory in which all blocks are in unwritten status, said transfer unit including a transfer unit allocation map;

periodically identifying a selected unit, other than said transfer unit, to be erased;

reading each written block in said selected unit;

writing each written block in said selected unit into said transfer unit;

updating said transfer unit allocation map to indicate as written the status of blocks that have been written in the just previous writing step;

erasing said selected unit;

updating said virtual map to reflect the above-described movement of said written blocks.

5. A memory management method for a memory in which data can be written only in unwritten physical memory locations and in which a zone of contiguous memory locations can be simultaneously erased, comprising the steps of:

organizing the memory into a plurality of units;

organizing each unit into a plurality of blocks, each of said blocks made up of a plurality of contiguous physical memory locations;

establishing a first virtual map to map virtual addresses to physical addresses within a unit;

storing in said memory said first virtual map organized in segments of page addressable blocks;

storing in a random access memory a second virtual map which maps pages to physical address of said page addressable blocks stored in said memory; and in writing data to said memory at a virtual address:
(a) deriving a page address from said virtual address;
(b) mapping said page address to page addressable block in said memory;
(c) reading a segment of said first virtual map which maps virtual address to physical address at said page addressable block in said memory;
(d) mapping said virtual address to a physical address;
(e) if said block at said physical address is in an active written status;
 (1) writing said data into said memory to an unwritten block address;

(2) changing said first virtual map segment so that said first virtual map maps said virtual address to the physical address of the unwritten block in which said data has been written in step (e)(1);

(3) writing the changed first virtual map segment from step (e)(2) in an unwritten physical block location in said memory;

(4) updating said second virtual map stored in said random access memory so that maps the page address of the changed first virtual map segment of said unwritten physical block location;

in reading data from said memory at a virtual address:

(f) deriving a page address from said virtual address;

(g) mapping said page address to page addressable block in said memory;

(h) reading a segment of said first virtual map that maps virtual address to physical address at said page addressable block in said memory;

(i) mapping said virtual address to a physical address;

(j) reading said data from said memory at said physical address.

6. A memory management method as in claim 5, including the further steps of:

establishing a transfer unit in said memory in which all blocks are in unwritten status, said transfer unit including a transfer unit allocation map;

periodically identifying a selected unit, other than said transfer unit, to be erased;

reading each written block in said selected unit;

writing each written block in said selected unit into said transfer unit;

updating said transfer unit allocation map to indicate as written the status of blocks that have been written in the just previous writing step;

erasing said selected unit;

updating said virtual map to reflect the above-described movement of said written blocks.

* * * * *